(12) United States Patent
Awaga (10) Patent No.: US 12,505,864 B2
(45) Date of Patent: Dec. 23, 2025

(54) SEMICONDUCTOR STORAGE DEVICE (71) Applicant: Kioxia Corporation, Tokyo (JP)

(72) Inventor: Kosuke Awaga, Yokohama Kanagawa (JP)

(73) Assignee: Kioxia Corporation, Tokyo (JP)

( * ) Notice: Subject to any disclaimer, the term of this patent is extended or adjusted under 35 U.S.C. 154(b) by 217 days.

(21) Appl. No.: 18/365,718

(22) Filed: Aug. 4, 2023

(65) Prior Publication Data

US 2024/0046965 A1 Feb. 8, 2024

(30) Foreign Application Priority Data

Aug. 5, 2022 (JP) ................... 2022-125640

(51) Int. Cl.
*G11B 33/14* (2006.01)
*H05K 1/02* (2006.01)

(52) U.S. Cl.
CPC ......... *G11B 33/142* (2013.01); *H05K 1/0203* (2013.01); *H05K 2201/10416* (2013.01)

(58) Field of Classification Search
CPC ........... H05K 1/02–0212; H05K 1/144; H05K 1/181; H05K 7/20127; H05K 7/20145; H05K 7/20154; H05K 7/2039; H05K 7/20436; H05K 7/20445; H05K 7/209; H05K 7/20909; H05K 2201/10015; H05K 2201/10416; H05K 2201/042; H05K 2201/10522; H01L 23/3114; H01L 23/50; H01L 25/16; H01L 25/18; G11B 13/142
See application file for complete search history.

(56) References Cited

U.S. PATENT DOCUMENTS

| | | | | |
|---|---|---|---|---|
| 5,016,139 A | * | 5/1991 | Stopa | H05K 5/0247 361/720 |
| 11,589,479 B1 | * | 2/2023 | Zhang | H05K 7/20454 |
| 2003/0196779 A1 | * | 10/2003 | Horng | H01L 23/467 165/122 |
| 2013/0258602 A1 | * | 10/2013 | Hatai | H05K 7/20409 361/729 |
| 2020/0052630 A1 | * | 2/2020 | Moser | H02K 11/05 |
| 2020/0053906 A1 | * | 2/2020 | Moser | H05K 7/14322 |
| 2020/0118986 A1 | * | 4/2020 | Hori | H01L 23/427 |
| 2021/0015006 A1 | * | 1/2021 | Muto | H05K 5/13 |
| 2022/0304137 A1 | * | 9/2022 | Nagasawa | H05K 1/0203 |

FOREIGN PATENT DOCUMENTS

| | | | |
|---|---|---|---|
| JP | 2005044837 A | * | 2/2005 |
| JP | 5252793 B2 | | 7/2013 |
| JP | 6523136 B2 | | 5/2019 |
| JP | 2021-012993 A | | 2/2021 |
| TW | I764812 B | | 5/2022 |

OTHER PUBLICATIONS

JP-2005044837-A English Translation (Year: 2005).*

* cited by examiner

*Primary Examiner* — Amir A Jalali
(74) *Attorney, Agent, or Firm* — Kim & Stewart LLP (57) ABSTRACT

A semiconductor storage device has a substrate, a semiconductor chip, a capacitor, and a heatsink. The semiconductor chip is mounted on the substrate. The capacitor is mounted on the substrate and overlaps with the semiconductor chip in a thickness direction of the substrate. The heatsink has fins and the capacitor is mounted in the heatsink.

20 Claims, 5 Drawing Sheets

SEMICONDUCTOR STORAGE DEVICE

CROSS-REFERENCE TO RELATED APPLICATION(S)

This application is based upon and claims the benefit of priority from Japanese Patent Application No. 2022-125640, filed Aug. 5, 2022, the entire contents of which are incorporated herein by reference.

FIELD

Embodiments described herein relate generally to a semiconductor storage device.

BACKGROUND

A semiconductor storage device including a substrate and an electronic part mounted on the substrate is known. An improvement in heat dissipation is required of the semiconductor storage device.

DETAILED DESCRIPTION

Embodiments provide a semiconductor storage device having improved heat dissipation. In general, according to one embodiment, a semiconductor storage device includes a substrate, a semiconductor chip, a capacitor, and a heatsink. The semiconductor chip is mounted on the substrate. The capacitor is mounted on the substrate, and overlaps with the semiconductor chip in a thickness direction of the substrate. The heatsink has fins and the capacitor is mounted in the heatsink.

Hereafter, embodiments of a semiconductor storage device will be described, with reference to the drawings. In the description of the embodiments, identical reference signs are assigned to configurations having identical or similar functions. Further, in some cases, a redundant description of these configurations may be omitted. Ordinal numbers such as "first", "second", and "third" may be used. These ordinal numbers may not indicate a quantity of members to which the ordinal numbers are assigned.

In the following description, the term "coincide" means that virtual projected images of two objects coincide, and may also include a case in which the two objects are not in direct contact. Each of the terms "parallel", "perpendicular", and "identical" may also include cases of being "approximately parallel", "approximately perpendicular", and "approximately identical". The term "connection" is not limited to a mechanical connection, and may also include an electrical connection. In addition, the term "connection" is being limited to a case of being directly connected to an object, and may also include a case of being connected via a separate intervening element. Also, the term "connection" is not limited to a case of being mutually linked, and may also include a case of simply being in contact.

Herein, a +X direction, a −X direction, a +Y direction, a −Y direction, a +Z direction, and a −Z direction will be defined in advance. The +X direction, the −X direction, the +Y direction, and the −Y direction are directions parallel to a first face 21a of a substrate 21 to be described hereafter (refer to FIG. 2). The +X direction is a direction from a first end portion 10a of a housing 10, to be described hereafter, toward a second end portion 10b (refer to FIG. 1). The −X direction is a direction opposite to the +X direction. The +X direction and the −X direction are simply referred to as an "X direction" when there is no need to distinguish between the two. The +Y direction and the −Y direction are directions that intersect (for example, are perpendicular to) the X direction.

Figure 1:
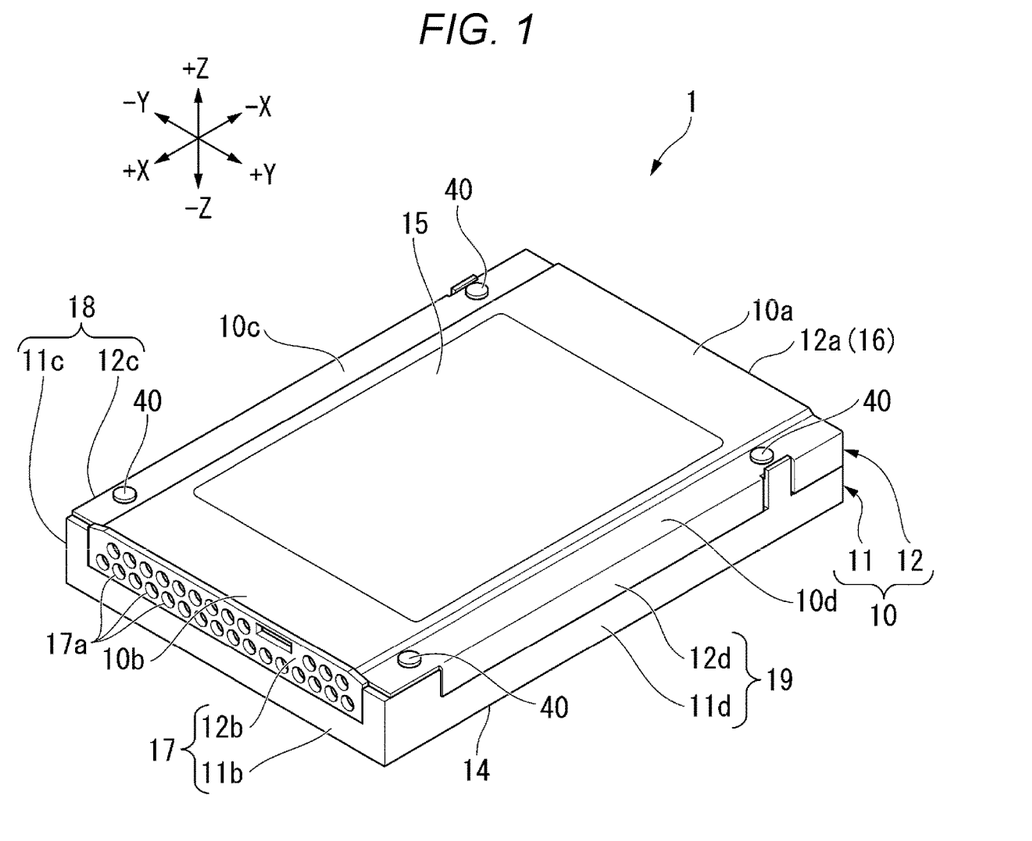
FIG. 1 is a perspective view showing a semiconductor storage device of a first embodiment.

The +Y direction is a direction from a third end portion 10c of the housing 10, to be described hereafter, toward a fourth end portion 10d (refer to FIG. 1). The −Y direction is a direction opposite to the +Y direction. The +Y direction and the −Y direction are simply referred to as a "Y direction" when there is no need to distinguish between the two. The +Z direction and the −Z direction are directions that intersect (for example, are perpendicular to) the X direction and the Y direction, and are thickness directions of the substrate 21 to be described hereafter.

Figure 2:
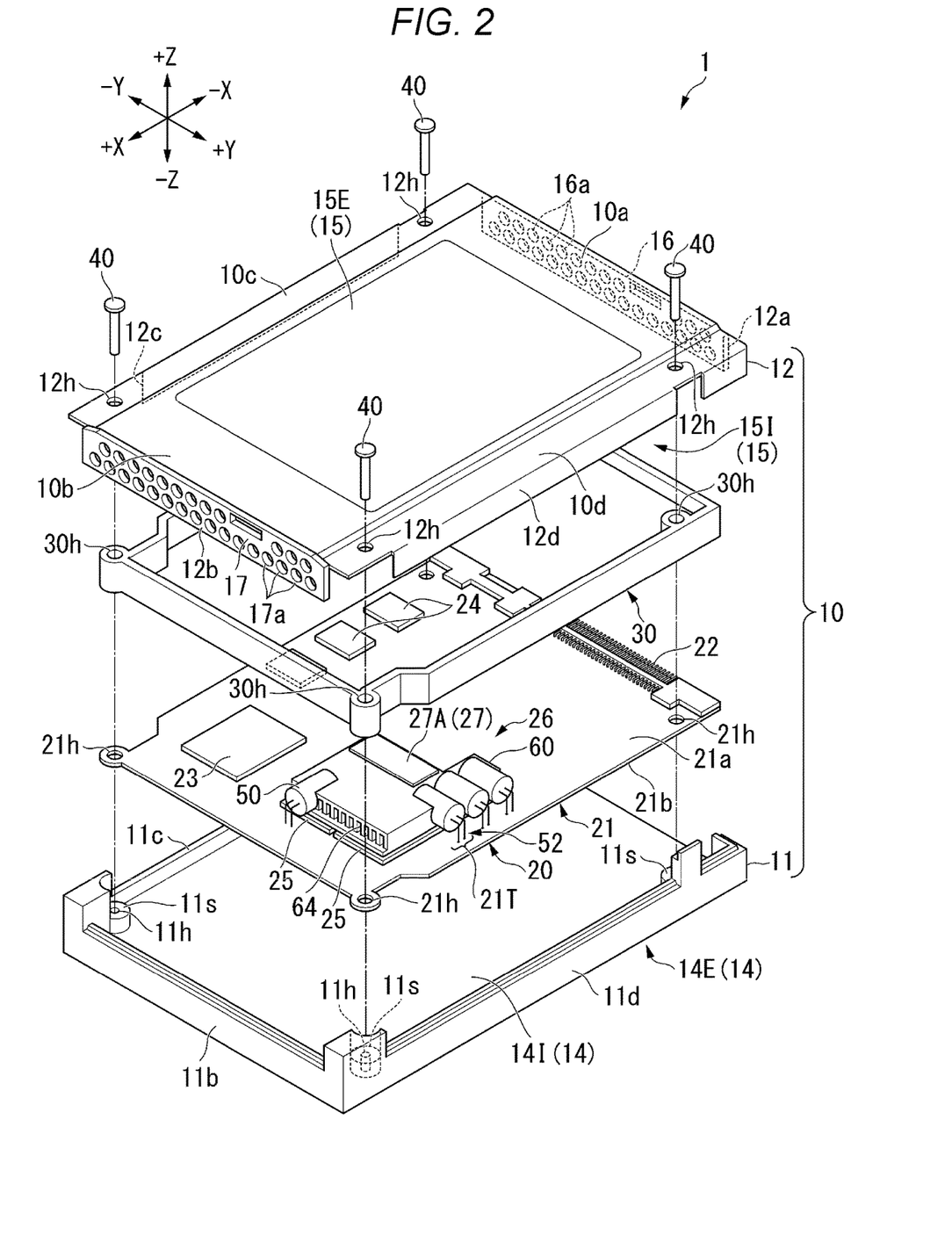
FIG. 2 is an exploded perspective view showing one portion of the semiconductor storage device of the first embodiment in a disassembled state.

The +Z direction is a direction from the substrate 21 toward a cover main wall 15 of the housing 10, to be described hereafter (refer to FIG. 2). The −Z direction is a direction opposite to the +Z direction. The +Z direction and the −Z direction are simply referred to as a "Z direction" when there is no need to distinguish between the two. The Z direction is a thickness direction of the substrate 21.

In the following description, the X direction, the Y direction, and the Z direction may simply be referred to as the XYZ directions when referenced collectively. The X direction, the Y direction, and the Z direction may also be referred to as a first direction, a second direction, and a third direction respectively.

First Embodiment

Overall Configuration of Semiconductor Storage Device

Referring to FIGS. 1 to 4, a semiconductor storage device 1 of a first embodiment will be described. The semiconductor storage device 1 is, for example, a storage device such as an SSD (solid state drive). The semiconductor storage device 1 is, for example, attached to an information processing device such as a server or a personal computer, and is utilized as a storage area of the information processing device. In the present embodiment, an information processing device to which the semiconductor storage device 1 is attached is referred to as a "host device".

Figure 3A:
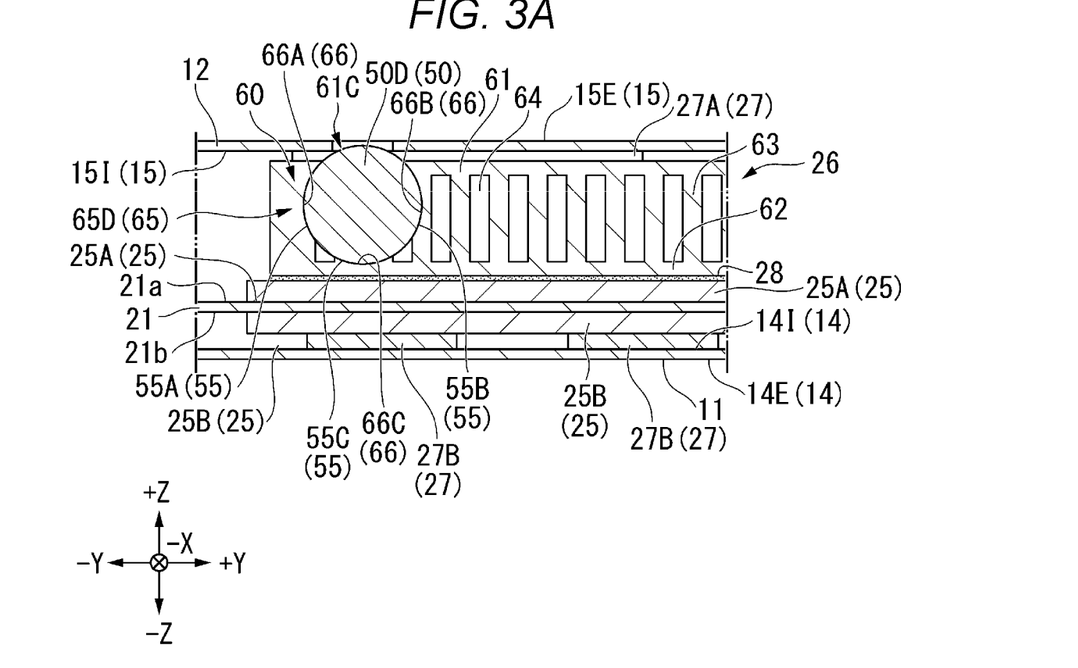
FIG. 3A is a sectional view partially showing a heatsink in the semiconductor storage device of the first embodiment.
Figure 3B:
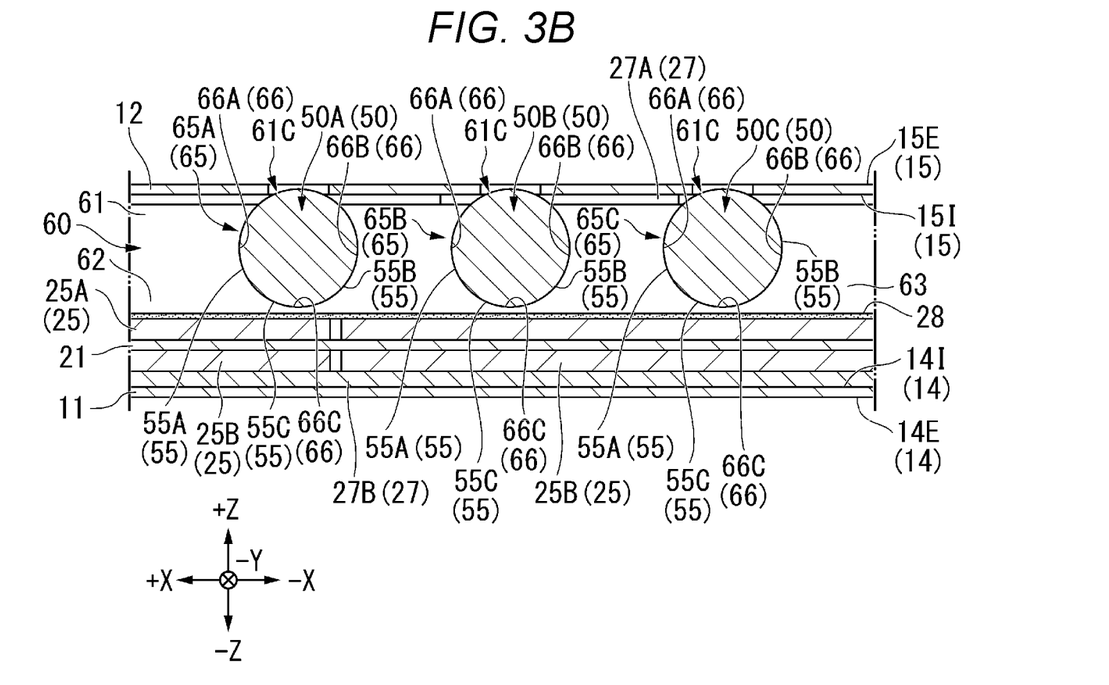
FIG. 3B is a sectional view partially showing a heatsink in the semiconductor storage device of the first embodiment.

FIG. 1 is a perspective view showing the semiconductor storage device 1. FIG. 2 is an exploded perspective view showing one portion of the semiconductor storage device 1 in a disassembled state. As shown in FIGS. 1 and 2, the semiconductor storage device 1 has, for example, the housing 10, a substrate unit 20, a supporting frame 30, and a plurality of fixing members 40. FIGS. 3A and 3B are sectional views partially showing the semiconductor storage device 1 of the present embodiment. FIG. 3A shows a cross-section of a fourth capacitor 50D fixed to a heatsink 60. FIG. 3B shows cross-sections of a first capacitor 50A, a second capacitor 50B, and third capacitor 50C fixed to the heatsink 60.

Housing

As shown in FIG. 1, the housing 10 is of, for example, a flattened rectangular box form. The housing 10 is made of, for example, metal. The housing 10 has the first end portion 10a and the second end portion 10b as a pair of end portions separated in a longitudinal direction (the X direction) of the housing 10. The second end portion 10b is an end portion on a side opposite to that of the first end portion 10a. An aperture (not shown) is provided in the first end portion 10a. The aperture provided in the first end portion 10a causes a connector 22 (refer to FIG. 2) of the substrate unit 20, to be described hereafter, to be exposed to an exterior of the housing 10.

The housing 10 has the third end portion 10c and the fourth end portion 10d as a pair of end portions separated in a lateral direction (the Y direction) of the housing 10. The fourth end portion 10d is an end portion on a side opposite to that of the third end portion 10c. As shown in FIG. 2, the housing 10 includes a base 11 and a cover 12. The housing 10 is configured by the base 11 and the cover 12 being combined. Each of the base 11 and the cover 12 is an example of a "housing". The cover 12 is an example of a "first housing member". The base 11 is an example of a "second housing member". The housing 10 houses the substrate unit 20. That is, the housing 10 houses the substrate 21, a controller 23, a DRAM 24, a NAND 25, a capacitor 50, and the heatsink 60, to be described hereafter.

Base

The base 11 has, for example, a base main wall 14 and three side walls 11b, 11c, and 11d. The base main wall 14 is a wall that extends in the X direction and the Y direction. The base main wall 14 has a base outer face 14E and a base inner face 14I. The base outer face 14E faces the −Z direction. The base outer face 14E forms an outer surface of the semiconductor storage device 1 in the −Z direction.

The base inner face 14I faces the +Z direction. The base inner face 14I is a face that opposes a second face 21b of the substrate 21. One portion of the base inner face 14I is connected to a second heat conducting sheet 27B, to be described hereafter. The base inner face 14I is an example of a "second inner face".

The three side walls 11b, 11c, and 11d are side walls corresponding to the second end portion 10b, the third end portion 10c, and the fourth end portion 10d of the housing 10, respectively. Each of the three side walls 11b, 11c, and 11d extends in the +Z direction from the base main wall 14.

Cover

The cover 12 has the cover main wall 15 and four side walls 12a, 12b, 12c, and 12d. The cover main wall 15 is a wall that extends in the X direction and the Y direction. The cover main wall 15 has a cover outer face 15E and a cover inner face 15I. The cover outer face 15E faces the +Z direction. The cover outer face 15E forms an outer surface of the semiconductor storage device 1 in the +Z direction.

The cover inner face 15I faces the −Z direction. The cover inner face 15I is a face that opposes the first face 21a of the substrate 21. One portion of the cover inner face 15I is connected to a first heat conducting sheet 27A, to be described hereafter. The cover inner face 15I is an example of a "first inner face".

The four side walls 12a, 12b, 12c, and 12d are side walls corresponding to the first end portion 10a, the second end portion 10b, the third end portion 10c, and the fourth end portion 10d, respectively. Each of the four side walls 12a, 12b, 12c, and 12d extends in the −Z direction from the cover main wall 15.

The housing 10 has a first side wall 16, a second side wall 17, a third side wall 18, and a fourth side wall 19 formed by the base 11 and the cover 12 being combined (refer to FIG. 1). The first side wall 16 is a side wall on the −X direction side, and is formed of the side wall 12a of the cover 12. The second side wall 17 is a side wall on the +X direction side, and is formed of the side wall 11b of the base 11 and the side wall 12b of the cover 12. Each of the first side wall 16 and the second side wall 17 is a wall that extends in the Y direction and the Z direction. The third side wall 18 is a side wall on the −Y direction side, and is formed of the side wall 11c of the base 11 and the side wall 12c of the cover 12. The fourth side wall 19 is a side wall on the +Y direction side, and is formed of the side wall 11d of the base 11 and the side wall 12d of the cover 12. Each of the third side wall 18 and the fourth side wall 19 is a wall that extends in the X direction and the Z direction.

As shown in FIG. 2, the first side wall 16 of the housing 10 has a plurality of first vent-holes 16a. In the same way, the second side wall 17 of the housing 10 has a plurality of second vent-holes 17a. One of the first vent-hole 16a and the second vent-hole 17a may function as an intake hole, and the other as an exhaust hole. For example, when the semiconductor storage device 1 is placed in an installation environment in which air flows in the +X direction, air on the exterior of the housing 10 flows into an interior of the housing 10 from the first vent-hole 16a, and is discharged to the exterior of the housing 10 from the second vent-hole 17a. Meanwhile, when the semiconductor storage device 1 is placed in an installation environment in which air flows in the −X direction, air on the exterior of the housing 10 flows into the interior of the housing 10 from the second vent-hole 17a, and is discharged to the exterior of the housing 10 from the first vent-hole 16a. Hereafter, a case in which air flows in the −X direction, that is, a case in which air flows into the plurality of second vent-holes 17a, the air flows through the interior of the housing 10, and the air flows out from the plurality of first vent-holes 16a, will be described.

The base 11 has a plurality of mounting portions 11s on which the substrate 21, to be described hereafter, is mounted. The plurality of mounting portions 11s are provided corresponding to four corner portions of the housing 10. Each mounting portion 11s has a fixing hole 11h into which the fixing member 40, to be described hereafter, is inserted and fixed. The cover 12 has a plurality of insertion holes 12h through which the fixing member 40 is passed. The insertion hole 12h is provided at a position corresponding to the fixing hole 11h.

Supporting Frame

The supporting frame 30 is positioned between the substrate 21 and the cover 12. The supporting frame 30 is a spacer that fills a gap between the substrate 21 and the cover 12. The supporting frame 30 is of, for example, a frame form that follows an outer periphery of the substrate 21. The supporting frame 30 is mounted on the first face 21a of the substrate 21. The supporting frame 30 has a plurality of insertion holes 30h, through each of which the fixing member 40 is passed. The insertion hole 30h is provided at a position corresponding to the fixing hole 11h of the mounting portion 11s of the base 11. The supporting frame 30 is an optional component and may be omitted. In such a case, the cover 12, the substrate 21, and the base 11 may be fixed in an integrated manner by being fastened together using the fixing member 40.

Fixing Member

The fixing member 40 is inserted into the insertion hole 12h of the cover 12, the insertion hole 30h of the supporting frame 30, the insertion hole 21h of the substrate 21, and the fixing hole 11h of the base 11, thereby fixing the cover 12, the supporting frame 30, the substrate 21, and the base 11 in an integrated manner. The fixing member 40 may be a screw, or may be a fitting member such as a pin. It should be noted that the term "fixing member" is not limited to the aforementioned example. The fixing member 40, not being limited to a fixing member that fixes the base 11 and the cover 12, may also be a fixing member that fixes only either one of the base 11 and the cover 12 and the substrate 21.

Substrate Unit

The substrate unit 20 is positioned between the base 11 and the cover 12 of the housing 10. The substrate unit 20 is housed in the housing 10. The substrate unit 20 has the substrate 21, the connector 22, the controller 23, a plurality of the DRAM (dynamic random-access memory) 24, a plurality of the NAND type flash memory 25, a capacitor assembly 26, and a heat conducting sheet 27. In the present embodiment, the NAND type flash memory 25 is referred to as the "NAND 25".

Substrate

The substrate 21 is a plate-form member that extends in the X direction and the Y direction. The substrate 21 is a printed circuit board, and has an insulating base member, wiring provided on the insulating base member, and a connection terminal 21T. The wiring is connected to the connection terminal 21T, which is connected to a lead 52 of the capacitor 50 to be described hereafter. The substrate 21 has the first face 21a, and the second face 21b positioned on a side opposite to that of the first face 21a.

The first face 21a faces the +Z direction. The first face 21a opposes the cover inner face 15I of the cover main wall 15 of the housing 10. Meanwhile, the second face 21b faces the −Z direction. The second face 21b opposes the base inner face 14I of the base main wall 14.

The substrate 21 is mounted on the plurality of mounting portions 11s provided on the base 11. The substrate 21 has the plurality of insertion holes 21h. The fixing member 40 is passed through each of the plurality of insertion holes 21h. The insertion hole 21h is provided in a position corresponding to the fixing hole 11h of the mounting portion 11s of the base 11.

Connector

The connector 22 is provided on an end portion in the −X direction side of the substrate 21. The connector 22 has a plurality of metal terminals. The connector 22 is exposed to the exterior of the housing 10 through an aperture (not shown) provided in the first end portion 10a of the housing 10. The connector 22 is connectable to a connector of a host device. Because of this, the connector 22 may be referred to as an external connection connector.

Controller

The controller 23 is, for example, mounted on the first face 21a of the substrate 21. The controller 23 controls the entire semiconductor storage device 1. The controller 23 is, for example, a semiconductor package including a system on a chip (SoC) in which a host interface circuit for a host device, a control circuit that controls the plurality of DRAMs 24, a control circuit that controls the plurality of NANDs 25, and the like, are integrated in one semiconductor chip. The controller 23 is connected to the base main wall 14 of the base 11 via a thermal connection member (not shown). Because of this, one portion of heat generated by the controller 23 moves to the base main wall 14 of the base 11, and is dissipated to the exterior of the housing 10 from the base main wall 14 of the base 11.

In the present embodiment, the controller 23 is mounted on the first face 21a of the substrate 21. A face of the substrate 21 on which the controller 23 is mounted is not limited to the first face 21a. The controller 23 may also be mounted on the second face 21b of the substrate 21. Also, the controller 23 may also be mounted on both the first face 21a and the second face 21b of the substrate 21.

DRAM

The DRAM 24 is, for example, mounted on the first face 21a of the substrate 21. The DRAM 24 is a semiconductor package including a volatile semiconductor memory chip. The DRAM 24 is a data buffer in which write target data received from a host device, read target data read from the NAND 25, and the like, are temporarily stored. It should be noted that the semiconductor storage device 1 need not include the DRAM 24.

In the present embodiment, the DRAM 24 is mounted on the first face 21a of the substrate 21.

A face of the substrate 21 on which the DRAM 24 is mounted is not limited to the first face 21a of the substrate 21. The DRAM 24 may also be mounted on the second face 21b of the substrate 21. Also, the DRAM 24 may also be mounted on both the first face 21a and the second face 21b of the substrate 21.

The plurality of NANDs 25 are, for example, mounted on both the first face 21a and the second face 21b of the substrate 21. The NAND 25 mounted on the first face 21a is referred to herein as a first NAND 25A. The NAND 25 mounted on the second face 21b is referred to herein as a second NAND 25B.

In the following description, the first NAND 25A and the second NAND 25B may be simply referred to as the NAND 25.

The plurality of NANDs 25 are aligned in the X direction and the Y direction. The NAND 25 is a semiconductor package including a non-volatile semiconductor memory chip. The NAND 25 is a part that generates heat when the semiconductor storage device 1 operates, and is an example of a "heat generating part". It should be noted that a "heat generating part", not being limited to the NAND 25, may be the controller 23, the DRAM 24, or a part in the semiconductor storage device 1.

In the examples shown in FIGS. 3A and 3B, the NAND 25 is mounted on both the first face 21a and the second face 21b of the substrate 21, but as a modification, the NAND 25 may be mounted on only the first face 21a.

Capacitor Assembly

Figure 4:
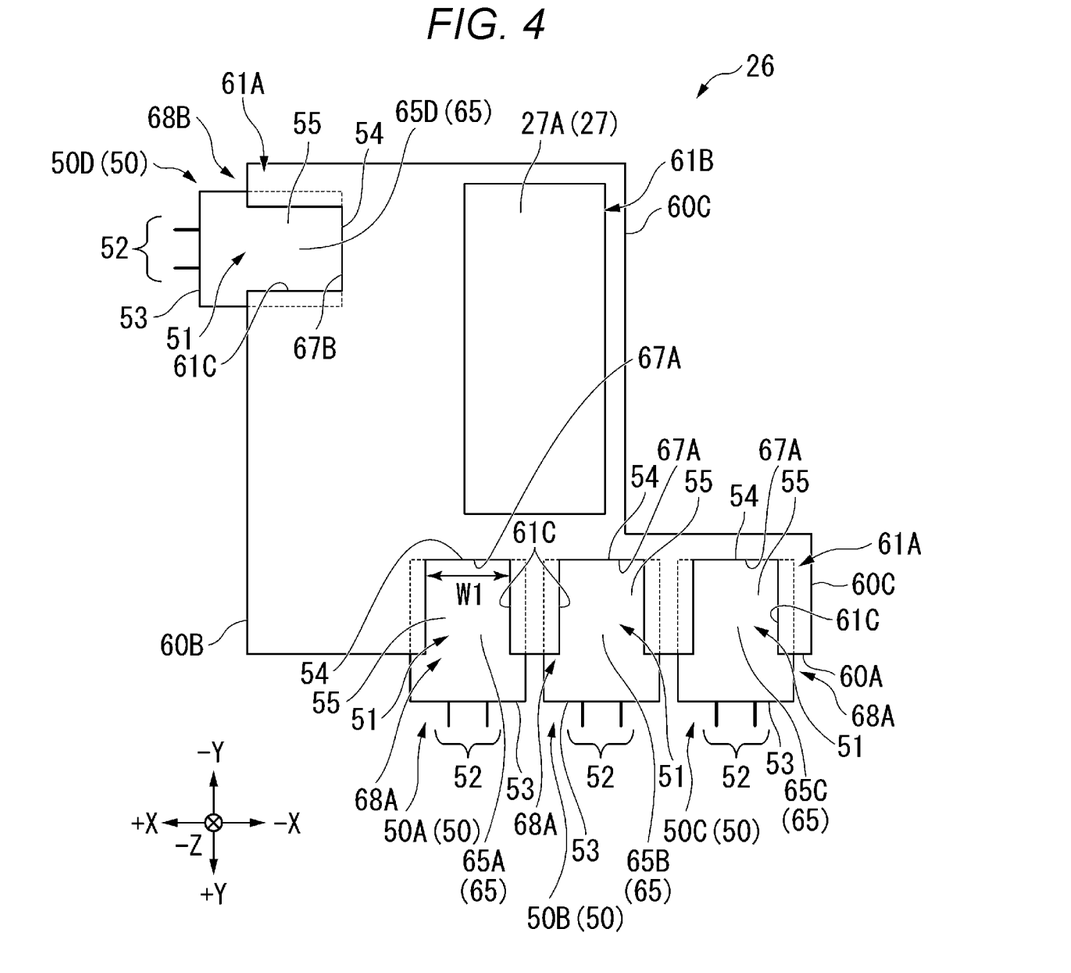
FIG. 4 is a plan view showing a capacitor assembly in the semiconductor storage device of the first embodiment.

FIG. 4 is a plan view of the capacitor assembly 26 in the semiconductor storage device 1, seen in the −Z direction. The capacitor assembly 26 has a plurality of the capacitor 50 and the heatsink 60. The capacitor assembly 26 is connected and fixed with respect to the NAND 25. As a structure of fixing the capacitor assembly 26 with respect to the NAND 25, for example, a pressing structure such that the cover 12 is pressed toward the capacitor assembly 26 by a fastening force of the fixing member 40 is suggested. Other than this kind of fixing structure, the capacitor assembly 26 may be fixed with respect to the NAND 25 using a fastening member such as a screw is used. Also, the capacitor assembly 26 may be fixed with respect to the NAND 25 using a combination of a pressing structure in which the cover 12 is used and a fastening member is used.

The capacitor assembly 26 is mounted such that the heatsink 60 is supporting the plurality of capacitors 50. The capacitor assembly 26 is mounted such that positions of the plurality of capacitors 50 in the X direction, the Y direction, and the Z direction are fixed. In other words, a position of the lead 52 of each of the plurality of capacitors 50 with respect to the connection terminal 21T formed on the first face 21a of the substrate 21 is determined before fixing the capacitor assembly 26 with respect to the NAND 25.

Capacitor

As shown in FIG. 4, the plurality of capacitors 50 coincide with the NAND 25 in the Z direction. The plurality of capacitors 50 include the first capacitor 50A, the second capacitor 50B, the third capacitor 50C, and the fourth capacitor 50D. The first capacitor 50A, the second capacitor 50B, and the third capacitor 50C are aligned in the X direction. In other words, the number of capacitors aligned in the X direction is three.

In the present embodiment, a case in which the number of capacitors is four is described, but the number of capacitors is not limited to four, and may be five or greater. Also, the number of capacitors aligned in each of the X direction and the Y direction is not limited to the example shown in FIG. 4. A disposition pattern of a plurality of capacitors in a capacitor assembly may be changed as appropriate in accordance with a design of the semiconductor storage device 1.

In the present embodiment, the four capacitors 50A, 50B, 50C, and 50D may be referred to as the four capacitors 50. Also, in order to omit a description of each of the four capacitors 50, one capacitor 50 may be described.

The capacitor 50 performs a power supply backup function for data protection when there is an unexpected power interruption. For example, when a power supply from a host device is unexpectedly interrupted, the capacitor 50 supplies power for a certain period of time to the controller 23, the plurality of DRAMs 24, the plurality of NANDs 25, and the like. The capacitor 50 is, for example, an electrolytic capacitor. More specifically, the capacitor 50 is, for example, an aluminum electrolytic capacitor. It should be noted that the capacitor 50 is not limited to the aforementioned example.

The capacitor 50 has a main body 51 and a pair of leads 52. The main body 51 is formed in a columnar form. The main body 51 has a lead protrusion face 53, a leading end face 54 positioned on a side opposite to that of the lead protrusion face 53, and an outer peripheral face 55. The lead protrusion face 53 is a face where the lead 52 protrudes from the main body 51. The lead 52 is electrically connected to wiring formed on the first face 21a of the substrate 21. A connection structure such as a joining member is used as a structure to provide electrical and structural connection between the lead 52 and the wiring. For example, a solder or an electrically conductive paste may be used as a joining member.

Heatsink

The heatsink 60 has a first plate portion 61, a second plate portion 62, a plurality of fins 63, a plurality of air flow paths 64, and a supporting portion 65. As shown in FIGS. 3A and 3B, the heatsink 60 coincides with the NAND 25 when seen in the Z direction. In other words, the heatsink 60 is connected to the NAND 25 in the Z direction. The heatsink 60 is a heat dissipating part that dissipates heat generated by the NAND 25 and the capacitor 50.

As shown in FIG. 4, the heatsink 60 has a first side face 60A parallel to the X direction, a second side face 60B parallel to the Y direction, and a third side face 60C parallel to the Y direction. The first side face 60A is oriented in the +Y direction. The second side face 60B is oriented in the +X direction. The third side face 60C is a side face positioned on a side opposite to that of the second side face 60B. The third side face 60C is oriented in the −X direction.

A metal material with excellent heat conductivity is employed as a material of the heatsink 60. The metal material is, for example, aluminum or copper. A conventional processing method is employed as a method of processing the heatsink 60. For example, a whole form of a heatsink structural body including the air flow path 64 may be formed using an extrusion molding method, which is one type of plastic working. Subsequently, the heretofore described heatsink 60 may be formed by forming a plurality of the supporting portion 65 in the heatsink structural body using a cutting process.

First Plate Portion

The first plate portion 61 is a face that opposes the cover inner face 15I. The first plate portion 61 has a capacitor disposition region 61A, a heat conducting sheet disposition region 61B, and an aperture portion 61C. The first plate portion 61 functions as a heat dissipating portion that dissipates heat of the heatsink 60 to an exterior of the heatsink 60. The plurality of capacitors 50 are disposed in the capacitor disposition region 61A. The first heat conducting sheet 27A is connected to the heat conducting sheet disposition region 61B. The heat conducting sheet disposition region 61B is connected to the cover inner face 15I across the first heat conducting sheet 27A. The aperture portion 61C causes one portion of the capacitor 50 to be exposed in the +Z direction.

A form that does not cause the capacitor 50 to be exposed, that is, a form in which the aperture portion 61C is not formed in the first plate portion 61, may also be employed as a form of the first plate portion 61. Also, a width of the aperture portion 61C in the first plate portion 61, for example, a width W1 in the X direction of the first capacitor 50A, may be adjusted.

As shown in FIGS. 3A, 3B, and 4, a decision regarding whether to form the aperture portion 61C, and adjustment of the width of the aperture portion 61C, is carried out in accordance with a size (for example, a diameter) of the capacitor 50 or a thickness of the heatsink 60 in the Z direction. For example, when the diameter of the capacitor 50 is comparatively small, the capacitor 50 may be disposed in an interior of the heatsink 60 without forming the aperture portion 61C. When the diameter of the capacitor 50 is comparatively large, the aperture portion 61C may be formed.

When a design of the semiconductor storage device 1 is such that the thickness of the heatsink 60 may be comparatively large, the capacitor 50 may be disposed in the interior of the heatsink 60 without forming the aperture portion 61C. When the thickness of the heatsink 60 needs to be comparatively small, the aperture portion 61C may be formed.

Second Plate Portion

As shown in FIG. 3A, the second plate portion 62 is a region positioned on a side opposite to that of the first plate portion 61 in the Z direction. The second plate portion 62 is connected to the first NAND 25A. In the present embodiment, a heat conducting member 28, such as a heat conducting tape or a grease, is provided between the first NAND 25A and the second plate portion 62. In other words, the second plate portion 62 is connected to the first NAND 25A across the heat conducting member 28. That is, the second plate portion 62 is a region that receives heat generated by the first NAND 25A. That is, the second plate portion 62 functions as a heat receiving portion. Provided that heat conductivity between the first NAND 25A and the second plate portion 62 can be secured, the second plate portion 62 may be connected directly to the first NAND 25A. When seen in the Z direction, the second plate portion 62 has a planar form that coincides with a disposition pattern of the first NAND 25A mounted on the first face 21a of the substrate 21.

Fin

The fin 63 is provided between the first plate portion 61 and the second plate portion 62. The fin 63 extends from the second plate portion 62 to the first plate portion 61 in the +Z direction. The fin 63 extends parallel to the X direction. The fin 63 faces the air flow path 64 in order that a heat exchange can be carried out between air flowing along the air flow path 64 and a surface of the fin 63. The fin 63 functions as a heat dissipating portion that causes heat of the heatsink 60 to move to air flowing along the air flow path 64.

In the present embodiment, a direction in which air flows in and out is the X direction. That is, the direction in which the fin 63 extends is the X direction. However, a direction in which the fin 63 extends is not limited to the X direction. The direction in which the fin 63 extends may be the Y direction. The direction in which the fin 63 extends is determined in accordance with positions in which the plurality of first vent-holes 16a and the plurality of second vent-holes 17a are formed, that is, a direction in which air flows in from the exterior of the housing 10 to the interior of the housing 10, and a direction in which air flows out from the interior of the housing 10 to the exterior of the housing 10.

Air Flow Path

The plurality of air flow paths 64 are provided between the first plate portion 61 and the second plate portion 62. Each of the plurality of air flow paths 64 is formed between two fins 63 that neighbor each other among the plurality of fins 63. The air flow path 64 opens in each of the second side face 60B and the third side face 60C. The air flow path 64 extends from the second plate portion 62 to the first plate portion 61 in the +Z direction. The air flow path 64 extends in the X direction from the second side face 60B toward the third side face 60C.

In the present embodiment, air that flows from the exterior of the semiconductor storage device 1 into the plurality of second vent-holes 17a flows into the plurality of air flow paths 64 opened in the third side face 60C. The air flows through an interior of the plurality of air flow paths 64, and flows out from the plurality of air flow paths 64 opened in the second side face 60B. Air that flows out from the plurality of air flow paths 64 is discharged to the exterior of the semiconductor storage device 1 through the plurality of first vent-holes 16a.

Supporting Portion

Each of the plurality of supporting portions 65 supports the capacitor 50 in the heatsink 60. The supporting portion 65 is a region that receives heat generated by the capacitor 50. Because of this, the supporting portion 65 functions as a heat receiving portion, or functions as a heat receiving supporting portion.

The plurality of supporting portions 65 are a first supporting portion 65A, a second supporting portion 65B, a third supporting portion 65C, and a fourth supporting portion 65D. The first supporting portion 65A, the second supporting portion 65B, the third supporting portion 65C, and the fourth supporting portion 65D support the first capacitor 50A, the second capacitor 50B, the third capacitor 50C, and the fourth capacitor 50D, respectively.

The first capacitor 50A, the second capacitor 50B, and the third capacitor 50C are inserted into the first supporting portion 65A, the second supporting portion 65B, and the third supporting portion 65C respectively in the Y direction. The fourth capacitor 50D is inserted into the fourth supporting portion 65D in the X direction. That is, the heatsink 60 can support a plurality of capacitors whose directions of insertion into the supporting portion 65 differ from each other.

In the following description, the four supporting portions 65A, 65B, 65C, and 65D may be referred to as the four supporting portions 65. Also, in order to omit a description of each of the four supporting portions 65, one supporting portion 65 may be described.

As shown in FIG. 3A, the fourth supporting portion 65D has a supporting face 66 that supports the fourth capacitor 50D. As shown in FIG. 3B, the first supporting portion 65A, the second supporting portion 65B, and the third supporting portion 65C each have the supporting face 66, which supports the first capacitor 50A, the second capacitor 50B, and the third capacitor 50C, respectively.

The supporting face 66 includes a first supporting face 66A, a second supporting face 66B, and a third supporting face 66C. In FIG. 3A, the first supporting face 66A and the second supporting face 66B face each other in the Y direction. In FIG. 3B, the first supporting face 66A and the second supporting face 66B face each other in the X direction. The third supporting face 66C is a face oriented in the +Z direction.

Each of the first supporting face 66A, the second supporting face 66B, and the third supporting face 66C has a form that corresponds to the outer peripheral face 55 of the capacitor 50. In the present embodiment, each of the first supporting face 66A, the second supporting face 66B, and the third supporting face 66C has a curved surface that corresponds to a curved surface forming the outer peripheral face 55 of the capacitor 50.

The first supporting face 66A is connected to a side face 55A forming one portion of the outer peripheral face 55 of the capacitor 50. The second supporting face 66B is connected to a side face 55B forming one portion of the outer peripheral face 55 of the capacitor 50. The third supporting face 66C is connected to a side face 55C forming one portion of the outer peripheral face 55 of the capacitor 50. The side face 55C of the capacitor 50 is a face oriented in the −Z direction.

The first supporting face 66A and the second supporting face 66B are regions formed in one portion of the fin 63. The third supporting face 66C is a region formed in one portion of the fin 63 and one portion of the second plate portion 62.

The first supporting face 66A and the second supporting face 66B fix a position of the capacitor 50 inserted into the heatsink 60. That is, the first supporting face 66A and the second supporting face 66B shown in FIG. 3A fix a position of the capacitor 50D in the Y direction. The third supporting face 66C shown in FIG. 3A fixes a position of the capacitor 50D in the Z direction. In the same way, the first supporting face 66A and the second supporting face 66B shown in FIG. 3B fix X-direction positions of the capacitors 50A, 50B, and 50C. The third supporting face 66C shown in FIG. 3B fixes a Z-direction position of the capacitors 50A, 50B, and 50C.

As shown in FIG. 4, each of the first supporting portion 65A, the second supporting portion 65B, and the third supporting portion 65C is formed in the interior of the heatsink 60 in such a way as to extend in the −Y direction from the first side face 60A of the heatsink 60.

Each of the supporting portions 65A, 65B, and 65C has a supporting end face 67A and a supporting aperture portion 68A. The supporting end face 67A is a region connected to the leading end face 54 of the capacitors 50A, 50B, and 50C. The supporting aperture portion 68A is formed in the first side face 60A. The capacitors 50A, 50B, and 50C are inserted into the supporting aperture portion 68A.

The fourth supporting portion 65D is formed in the interior of the heatsink 60 in such a way as to extend in the −X direction from the second side face 60B of the heatsink 60. The fourth supporting portion 65D has a supporting end face 67B and a supporting aperture portion 68B. The supporting end face 67B is a region connected to the leading end face 54 of the capacitor 50D. The supporting aperture portion 68B is formed in the second side face 60B. The capacitor 50D is inserted into the supporting aperture portion 68B.

In other words, the supporting end faces 67A and 67B fix a position of the capacitor 50 inserted into the heatsink 60 through the supporting aperture portions 68A and 68B. That is, the supporting end face 67A fixes a Y-direction position of each of the capacitors 50A, 50B, and 50C. The supporting end face 67B fixes an X-direction position of the capacitor 50D. The supporting end faces 67A and 67B are examples of a "supporting face".

For example, a fitted structure and a bonded structure are suggested as a supporting structure in which the supporting portion 65 supports the capacitor 50. A fitted structure is such that the capacitor 50 is force-fitted into an interior of the supporting portion 65. Because of the force-fitting of the capacitor 50, resilience of the capacitor 50 is generated, and the outer peripheral face 55 of the capacitor 50 presses against the supporting face 66. Because of this, the capacitor 50 does not slide out from the supporting portion 65, and the capacitor 50 is fixed in the supporting portion 65. In this state, a position of the capacitor 50 in the capacitor assembly 26 is fixed. In this kind of fitted structure, a tapered portion may be formed on the supporting face 66 in such a way that a diameter in a cross-section of the supporting portion 65 gradually becomes smaller in a direction from a supporting aperture portion toward a supporting end face.

A bonded structure is such that an adhesive is injected into a gap between the supporting face 66 and the outer peripheral face 55 of the capacitor 50. Because of the adhesive adhering, the capacitor 50 is fixed to the supporting portion 65 by a bonding force of the adhesive. A known thermosetting resin or ultraviolet-curable resin may be used as an adhesive. One of a fitted structure or a bonded structure may be employed as a structure supporting the capacitor 50, or both may be employed.

Capacitor Assembly Formation Method

Firstly, the heatsink 60 having the four supporting portions 65 and the four capacitors 50 are prepared. Of the four capacitors 50, the three capacitors 50A, 50B, and 50C are inserted into the supporting aperture portion 68A of the supporting portions 65A, 65B, and 65C, respectively. Subsequently, the capacitors 50A, 50B, and 50C are caused to move in the −Y direction. By so doing, the leading end faces 54 of the capacitors 50A, 50B, and 50C are connected to the supporting end face 67A of the supporting portions 65A, 65B, and 65C, respectively. Consequently, positions in the Y direction of the three capacitors 50A, 50B, and 50C are fixed. Furthermore, the three capacitors 50A, 50B, and 50C are connected to the supporting face 66 of the supporting portions 65A, 65B, and 65C, respectively. Positions in the X direction of the three capacitors 50A, 50B, and 50C are fixed by the first supporting face 66A and the second supporting face 66B. Furthermore, positions in the Z direction of the three capacitors 50A, 50B, and 50C are fixed by the third supporting face 66C.

In the same way, the remaining capacitor 50D of the four capacitors 50 is inserted into the supporting aperture portion 68A of the supporting portion 65D. Subsequently, the capacitor 50D is caused to move in the −X direction. By so doing, the leading end face 54 of the capacitor 50D is connected to the supporting end face 67A of the supporting portion 65D. Consequently, a position in the X direction of the capacitor 50D is fixed. Furthermore, the capacitor 50D is connected to the supporting face 66 of the supporting portion 65D. A position in the Y direction of the capacitor 50D is fixed by the first supporting face 66A and the second supporting face 66B. Furthermore, a position in the Z direction of the capacitor 50D is fixed by the third supporting face 66C.

According to this kind of formation method, the capacitor assembly 26 in which the capacitors 50A, 50B, 50C, and 50D are supported by the heatsink 60 can be formed.

Heat Conducting Sheet

The heat conducting sheet 27 is provided on both sides in the Z direction of the substrate unit 20. Specifically, the heat conducting sheet 27 includes the first heat conducting sheet 27A and the second heat conducting sheet 27B. For example, a known heat conducting sheet may be used as the heat conducting sheet 27.

The heat conducting sheet 27 is an example of a "heat conducting body". A heat conducting body other than a sheet-form heat conducting body may be used, provided that the heat conducting body is a member or a material that can conduct heat. For example, a grease having heat conductivity may be used instead of the heat conducting sheet 27. Also, a heat conducting tape may be used instead of the heat conducting sheet 27.

First Heat Conducting Sheet

As shown in FIG. 4, the first heat conducting sheet 27A is provided in the heat conducting sheet disposition region 61B on the first plate portion 61 of the heatsink 60. As shown in FIGS. 3A and 3B, the first heat conducting sheet 27A is provided between the first plate portion 61 and the cover inner face 15I in the Z direction. Because of the fastening force created by the fixing member 40 between the housing 10 and the substrate unit 20, the first heat conducting sheet 27A is pressed by the first plate portion 61 and the cover inner face 15I. Because of the fastening force created by the fixing member 40, the first heat conducting sheet 27A and the heatsink 60 come into close contact, and the first heat conducting sheet 27A and the cover 12 come into close contact. Consequently, heat conductivity between the heatsink 60 and the cover 12 improves as a result of the first heat conducting sheet 27A being interposed.

Also, a position of the heat conducting sheet disposition region 61B in which the first heat conducting sheet 27A is provided is not limited to the position shown in FIG. 4. The first heat conducting sheet 27A may also be provided over the entire surface of the first plate portion 61 of the heatsink 60. Also, a form of the first heat conducting sheet 27A is not limited to any particular one.

Second Heat Conducting Sheet

As shown in FIGS. 3A and 3B, the second heat conducting sheet 27B is provided between the second NAND 25B and the base inner face 14I in the Z direction. Because of the fastening force created by the fixing member 40 between the housing 10 and the substrate unit 20, the second heat conducting sheet 27B is pressed by the second NAND 25B and the base inner face 14I. Because of the fastening force created by the fixing member 40, the second heat conducting sheet 27B and the second NAND 25B come into close contact, and the second heat conducting sheet 27B and the base 11 come into close contact. Consequently, heat conductivity between the second NAND 25B and the base 11 improves as a result of the second heat conducting sheet 27B being interposed.

Method of Mounting Capacitor Assembly on Substrate

In the following description, a mounting method whereby a capacitor assembly is mounted on a substrate by causing a mounting robot to operate will be described. As a modification, a mounting method whereby a capacitor assembly is mounted on a substrate by an operation by an operator may be implemented.

Firstly, a mounting robot used in a manufacture of the semiconductor storage device 1 grips the capacitor assembly 26, and causes the capacitor assembly 26 to oppose the first face 21a of the substrate 21. At this juncture, the positions of the capacitors 50A, 50B, 50C, and 50D in the capacitor assembly 26 are predetermined.

In a state in which the capacitor assembly 26 and the substrate 21 are separated in the Z direction, the mounting robot adjusts a position of the lead 52 of the capacitors 50A, 50B, 50C, and 50D in the X direction and the Y direction, and a position of the connection terminal 21T on the first face 21a of the substrate 21 in the X direction and the Y direction.

Subsequently, the mounting robot brings the capacitor assembly 26 toward the substrate 21, and puts the second plate portion 62 of the heatsink 60 in the capacitor assembly 26 on the first NAND 25A. The heat conducting member 28 is provided on the first NAND 25A before mounting the capacitor assembly 26. Because of this, the capacitor assembly 26 is disposed on the first NAND 25A across the heat conducting member 28. The capacitor assembly 26 may be disposed on the first NAND 25A in a state in which the heat conducting member 28 is provided on the second plate portion 62. After the capacitor assembly 26 is mounted on the substrate 21, the mounting robot releases the capacitor assembly 26, and withdraws from the substrate 21.

Because of this, as shown in FIG. 2, the lead 52 of the capacitors 50A, 50B, 50C, and 50D is connected to the connection terminal 21T on the first face 21a. Subsequently, the lead 52 is electrically connected to the connection terminal 21T on the first face 21a using a solder.

Operational Advantages

Heat Dissipation Improvement

Heat is generated by the first NAND 25A, the second NAND 25B, and the four capacitors 50 as a result of operating the semiconductor storage device 1. Heat generated by the first NAND 25A moves to the heatsink 60 via the heat conducting member 28 and the second plate portion 62. Heat generated by the second NAND 25B moves to the base 11 via the second heat conducting sheet 27B. Heat generated by the four capacitors 50 moves to the heatsink 60 via the first supporting face 66A, the second supporting face 66B, and the third supporting face 66C, which are in contact with the outer peripheral face 55.

The heatsink 60 includes the plurality of fins 63 and the plurality of air flow paths 64. Air flowing along the air flow path 64 comes into contact with the fin 63. Because of this, heat of the heatsink 60 moves to the air flowing along the air flow path 64. That is, a heat exchange is carried out between the air flowing along the air flow path 64 and the surface of the fin 63. Consequently, heat of the heatsink 60 is discharged to the exterior of the heatsink 60 by the air flowing along the air flow path 64.

Furthermore, the first heat conducting sheet 27A is provided between the first plate portion 61 of the heatsink 60 and the cover inner face 15I of the cover 12. The heat of the heatsink 60 moves to the cover 12 via the first heat conducting sheet 27A.

According to the semiconductor storage device 1 having this kind of configuration, the heatsink 60 has the plurality of air flow paths 64, and is connected to the cover 12 across the first heat conducting sheet 27A. Because of this, heat generated by the first NAND 25A and the four capacitors 50 can be discharged to the exterior of the semiconductor storage device 1 via the air flowing along the plurality of air flow paths 64. Furthermore, heat generated by the first NAND 25A and the four capacitors 50 can be discharged to the exterior of the semiconductor storage device 1 via the first heat conducting sheet 27A and the cover 12. Also, heat generated by the second NAND 25B can be discharged to the exterior of the semiconductor storage device 1 via the second heat conducting sheet 27B and the base 11.

Rigidity Improvement

The semiconductor storage device 1 has a configuration where the substrate unit 20 is pressed by the base 11 and the cover 12 because of the fastening force of the fixing member 40. Because of the pressing force exerted on the substrate unit 20, the cover 12 presses the heatsink 60, and the heatsink 60 presses the first NAND 25A. Because of this, the capacitor assembly 26 is stably fixed to the first NAND 25A. This means that even when the capacitor 50 supported by the heatsink 60 in the capacitor assembly 26 is subjected to a shock or vibration, the supporting portion 65 stably supports the capacitor 50. That is, the position of the capacitor 50 does not change, and breaking and bending of the lead 52 of the capacitor 50 can be prevented.

Capacitor Positioning Improvement

The positions in the XYZ directions of the capacitors 50A, 50B, 50C, and 50D in the capacitor assembly 26 are fixed. In other words, the position in the XYZ directions of the lead 52 of each of the plurality of capacitors 50 with respect to the connection terminal 21T is predetermined in the capacitor assembly 26 before the capacitor assembly 26 is provided in the first NAND 25A.

Because of this, there is no need to use a positioning jig when mounting the individual capacitor 50 on the first face 21a, as is the case in an existing mounting process, and the lead 52 of each of the plurality of capacitors 50 can be accurately disposed in the connection terminal 21T simply by providing the capacitor assembly 26 on the first NAND 25A.

Also, as there is no need to mount the individual capacitor 50 directly on the first face 21a of the substrate 21, assembly efficiency improves. In other words, the capacitor assembly 26 is formed before mounting in the substrate unit 20, because of which there is no need to carry out a process of mounting the capacitor 50 on the first face 21a and a process of mounting the heatsink 60 on the first face 21a separately. The heatsink 60 and the four capacitors 50 can be mounted in the substrate unit 20 simply by providing the capacitor assembly 26 on the first NAND 25A, whereby assembly efficiency improves.

Second Embodiment

Figure 5:
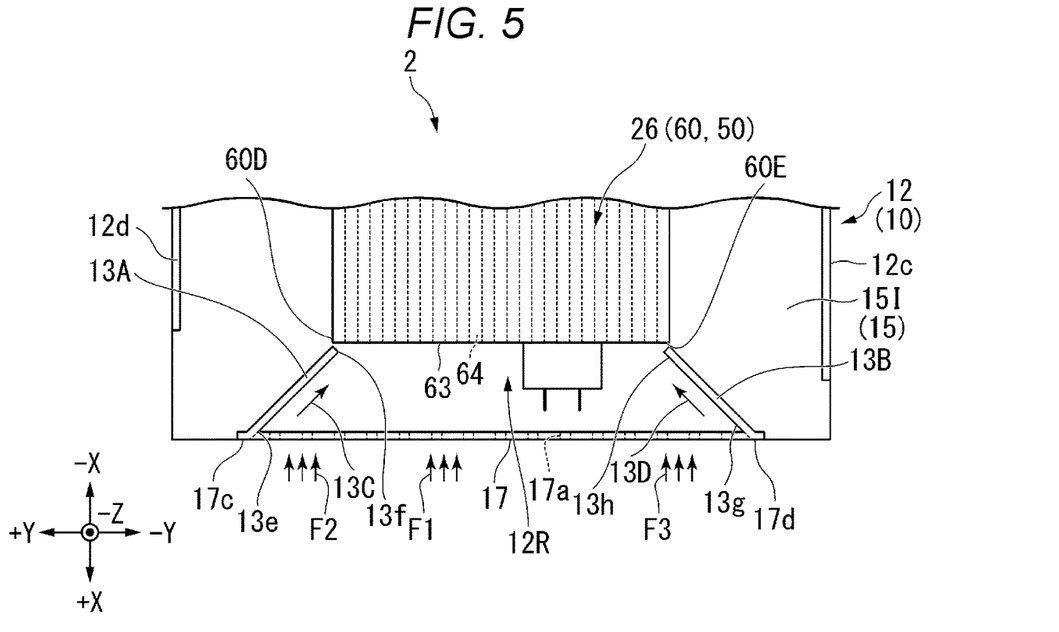
FIG. 5 is a bottom view showing a cover, a heatsink, and a capacitor in a semiconductor storage device of a second embodiment.

A semiconductor storage device 2 of a second embodiment will be described, with reference to FIG. 5. In the second embodiment, an identical reference sign is assigned to a member identical to the first embodiment, and a description thereof is omitted or simplified. FIG. 5 is a bottom view in which the cover 12 and the capacitor assembly 26 in the semiconductor storage device 2 of the second embodiment are seen from below.

Cover

The cover 12 forms one portion of the housing 10. As heretofore described, the housing 10 houses the substrate unit 20, the capacitor 50, and the heatsink 60. The cover 12 has the second side wall 17. The second vent-hole 17a, through which air flowing into the housing 10 flows, is formed in the second side wall 17.

Guide Plate

As shown in FIG. 5, the cover 12 has a guide plate 13 provided on the cover inner face 15I. The guide plate 13 is provided on the cover inner face 15I in such a way as to protrude in the −Z direction. The guide plate 13 includes a first guide plate 13A positioned on the +Y direction side of the cover 12 and a second guide plate 13B positioned on the −Y direction side of the cover 12. The guide plate 13 is an example of a "first guide portion". The first guide plate 13A and the second guide plate 13B are positioned in a region 12R between the second side wall 17 and the side face 60B of the heatsink 60. In other words, the first guide plate 13A is positioned on the +Y direction side in the region 12R, and the second guide plate 13B is positioned on the −Y direction side in the region 12R. Furthermore, specifically, the second side wall 17, the side face 60B of the heatsink 60, the first guide plate 13A, and the second guide plate 13B enclose the entire region 12R. Herein, in the state in which the entire region 12R is enclosed, two members neighboring each other may be provided separated, or may be connected.

The first guide plate 13A has a first aperture end portion 13e and a first guide end portion 13f. The first aperture end portion 13e is connected to an end portion 17c of the second side wall 17 positioned on the +Y direction side. The first guide end portion 13f opposes an end portion 60D of the side face 60B of the heatsink 60 positioned on the +Y direction side. In the example shown in FIG. 5, the first aperture end portion 13e is connected to the end portion 17c, but provided that an advantage of guiding air using the first guide plate 13A can be sufficiently obtained, the first aperture end portion 13e may be provided separated from the end portion 17c. The first guide end portion 13f opposes the end portion 60D, but provided that an advantage of guiding air using the first guide plate 13A can be sufficiently obtained, a distance between the first guide end portion 13f and the end portion 60D may be changed.

When seen in the Y direction, the first aperture end portion 13e is positioned farther to the +Y direction side than the first guide end portion 13f. In other words, the first aperture end portion 13e is positioned nearer than the first guide end portion 13f to the side wall 12d of the cover 12.

The first guide plate 13A is inclined in the X direction in such a way as to extend from the first aperture end portion 13e toward the first guide end portion 13f. For example, the first guide plate 13A extends in a direction of inclination indicated by reference sign 13C. In other words, the first guide plate 13A has an inclined face that is inclined with respect to the direction in which the air flow path 64 extends.

The second guide plate 13B has a second aperture end portion 13g and a second guide end portion 13h. The second aperture end portion 13g is connected to an end portion 17d of the second side wall 17 positioned on the −Y direction side. The second guide end portion 13h opposes an end portion 60E of the side face 60B of the heatsink 60 positioned on the −Y direction side. In the example shown in FIG. 5, the second aperture end portion 13g is connected to the end portion 17d, but provided that an advantage of guiding air using the second guide plate 13B can be sufficiently obtained, the second aperture end portion 13g may be provided separated from the end portion 17d. The second guide end portion 13h opposes the end portion 60E, but provided that an advantage of guiding air using the second guide plate 13B can be sufficiently obtained, a distance between the second guide end portion 13h and the end portion 60E may be changed.

When seen in the Y direction, the second aperture end portion 13g is positioned farther to the −Y direction side than the second guide end portion 13h. In other words, the second aperture end portion 13g is positioned nearer than the second guide end portion 13h to the side wall 12c of the cover 12.

The second guide plate 13B is inclined in the X direction in such a way as to extend from the second aperture end portion 13g toward the second guide end portion 13h. For example, the second guide plate 13B extends in a direction of inclination indicated by reference sign 13D. In other words, the second guide plate 13B has an inclined face that is inclined with respect to the direction in which the air flow path 64 extends.

Operational Advantages

Heat Dissipation Improvement

When the semiconductor storage device 2 is placed in an installation environment in which air flows in the −X direction, air on the exterior of the housing 10 flows into the interior of the housing 10 from the second vent-hole 17a, and is discharged to the exterior of the housing 10 from the first vent-hole 16a.

A flow of air flowing into the interior of the housing 10 through the second vent-hole 17a is indicated by reference signs F1, F2, and F3. The airflow F1 is an airflow that flows through the second vent-hole 17a formed in a central region of the second side wall 17 in the Y direction. The airflow F2 is an airflow that flows through the second vent-hole 17a formed in a region positioned on the +Y-direction side of the second side wall 17. The airflow F3 is an airflow that flows through the second vent-hole 17a formed in a region positioned on the −Y-direction side of the second side wall 17.

After flowing into the interior of the housing 10 through the second vent-hole 17a, the airflow F1 reaches the side face 60B of the heatsink 60, and flows into the air flow path 64 of the heatsink 60. A heat exchange is carried out between the air flowing along the air flow path 64 and the surface of the fin 63, and heat of the heatsink 60 moves to the air flowing along the air flow path 64. The air used in the heat exchange is discharged to the exterior of the housing 10 from the first vent-hole 16a.

After flowing into the interior of the housing 10 through the second vent-hole 17a, the airflow F2 collides with the first guide plate 13A. The air that collides with the first guide plate 13A flows in the direction of inclination 13C, reaches the side face 60B of the heatsink 60, and flows into the air flow path 64 of the heatsink 60. A heat exchange is carried out between the air flowing along the air flow path 64 and the surface of the fin 63, and heat of the heatsink 60 moves to the air flowing along the air flow path 64. The air used in the heat exchange is discharged to the exterior of the housing 10 from the first vent-hole 16a.

After flowing into the interior of the housing 10 through the second vent-hole 17a, the airflow F3 collides with the second guide plate 13B. The air that collides with the second guide plate 13B flows in the direction of inclination 13D, reaches the side face 60B of the heatsink 60, and flows into the air flow path 64 of the heatsink 60. A heat exchange is carried out between the air flowing along the air flow path 64 and the surface of the fin 63, and heat of the heatsink 60 moves to the air flowing along the air flow path 64. The air used in the heat exchange is discharged to the exterior of the housing 10 from the first vent-hole 16a.

According to the semiconductor storage device 2 having this kind of configuration, the airflows F2 and F3 can be guided to the air flow path 64 of the heatsink 60 by providing the first guide plate 13A and the second guide plate 13B on the cover 12. Consequently, in comparison with a structure in which no guide plate is provided, a greater amount of air can be caused to flow into the air flow path 64, and a heat exchange carried out between the air flowing along the air flow path 64 and the surface of the fin 63 can be promoted. That is, the advantage of heat dissipation improvement obtained according to the first embodiment can be further heightened.

Third Embodiment

Figure 6:
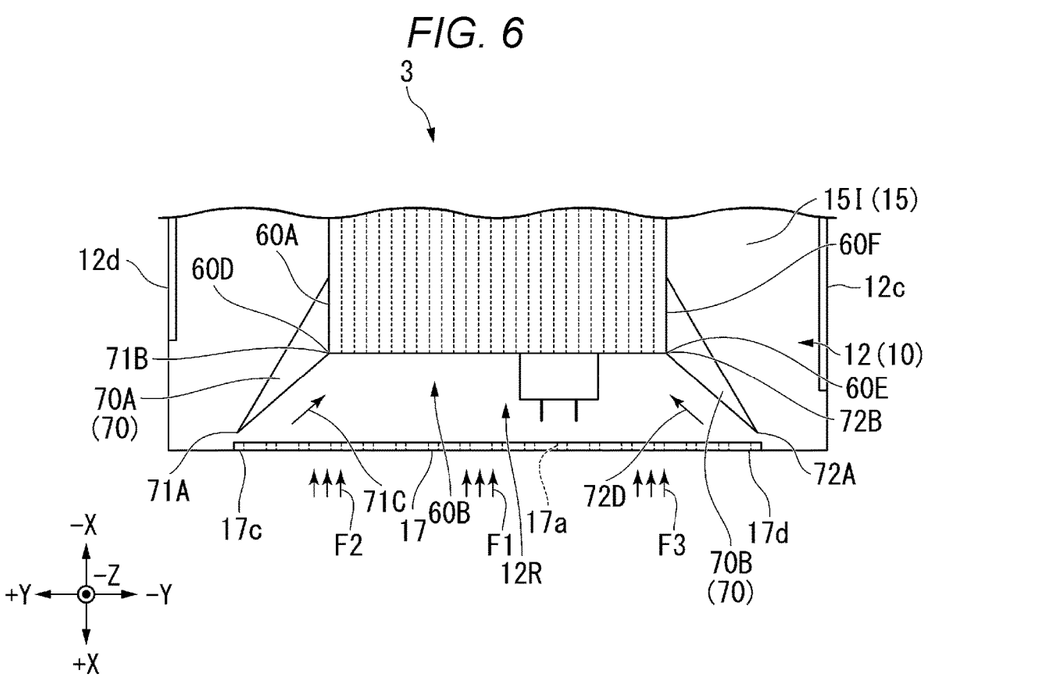
FIG. 6 is a bottom view showing a housing, a heatsink, and a capacitor in a semiconductor storage device of a third embodiment.

A semiconductor storage device 3 of a third embodiment will be described, with reference to FIG. 6. In the third embodiment, an identical reference sign is assigned to a member identical to the first embodiment or the second embodiment, and a description thereof is omitted or simplified. FIG. 6 is a bottom view in which the cover 12 and the capacitor assembly 26 in the semiconductor storage device 3 of the third embodiment are seen from below.

Guide Member

As shown in FIG. 6, the heatsink 60 has a guide member 70. The guide member 70 includes a first guide member 70A provided on the side face 60A on the +Y direction side of the heatsink 60 and a second guide member 70B provided on a side face 60F on the −Y direction side of the heatsink 60. The guide member 70 is an example of a "second guide portion". The first guide member 70A and the second guide member 70B are positioned in the region 12R between the second side wall 17 and the side face 60B of the heatsink 60. In other words, the first guide member 70A is positioned on the +Y direction side in the region 12R, and the second guide member 70B is positioned on the −Y direction side in the region 12R. Furthermore, specifically, the second side wall 17, the side face 60B of the heatsink 60, the first guide member 70A, and the second guide member 70B enclose the entire region 12R. Herein, in the state in which the entire region 12R is enclosed, two members neighboring each other may be provided separated, or may be connected.

For example, a bonded structure in which an adhesive is used, a fastened structure in which a fastening member such as a screw is used, or the like, is suggested as a structure of fixing the first guide member 70A and the second guide member 70B to the side faces 60A and 60F. In other words, the first guide member 70A and the second guide member 70B are members that are separate from the heatsink 60. Regarding a lightening of the semiconductor storage device 3, a resin material, for example, may be used as a material of the first guide member 70A and the second guide member 70B.

The first guide member 70A has a first aperture end portion 71A and a first guide end portion 71B. The first aperture end portion 71A opposes the end portion 17c of the second side wall 17 positioned on the +Y direction side. The first guide end portion 71B is connected to the end portion 60D of the side face 60B of the heatsink 60 positioned on the +Y direction side. Provided that an advantage of guiding air using the first guide member 70A can be sufficiently obtained, a distance between the first aperture end portion 71A and the end portion 17c may be changed.

When seen in the Y direction, the first aperture end portion 71A is positioned farther to the +Y direction side than the first guide end portion 71B. In other words, the first aperture end portion 71A is positioned nearer than the first guide end portion 71B to the side wall 12d of the cover 12.

The first guide member 70A is inclined in the X direction in such a way as to extend from the first aperture end portion 71A toward the first guide end portion 71B. For example, the first guide member 70A extends in a direction of inclination indicated by reference sign 71C. In other words, the first guide member 70A has an inclined face that is inclined with respect to the direction in which the air flow path 64 extends.

The second guide member 70B has a second aperture end portion 72A and a second guide end portion 72B. The second aperture end portion 72A opposes the end portion 17d of the second side wall 17 positioned on the −Y direction side. The second guide end portion 72B is connected to the end portion 60E of the side face 60B of the heatsink 60 positioned on the −Y direction side. Provided that an advantage of guiding air using the second guide member 70B can be sufficiently obtained, a distance between the second aperture end portion 72A and the end portion 17d may be changed.

When seen in the Y direction, the second aperture end portion 72A is positioned farther to the −Y direction side than the second guide end portion 72B. In other words, the second aperture end portion 72A is positioned nearer than the second guide end portion 72B to the side wall 12c of the cover 12.

The second guide member 70B is inclined in the X direction in such a way as to extend from the second aperture end portion 72A toward the second guide end portion 72B. For example, the second guide member 70B extends in a direction of inclination indicated by reference sign 72D. In other words, the second guide member 70B has an inclined face that is inclined with respect to the direction in which the air flow path 64 extends.

Operational Advantages

Heat Dissipation Improvement

When the semiconductor storage device 3 is placed in an installation environment in which air flows in the −X direction, air on the exterior of the housing 10 flows into the interior of the housing 10 from the second vent-hole 17a, and is discharged to the exterior of the housing 10 from the first vent-hole 16a.

A flow of air flowing into the interior of the housing 10 through the second vent-hole 17a is indicated by reference signs F1, F2, and F3. The airflow F1 is an airflow that flows through the second vent-hole 17a formed in a central region of the second side wall 17 in the Y direction. The airflow F2 is an airflow that flows through the second vent-hole 17a formed in a region positioned on the +Y-direction side of the second side wall 17. The airflow F3 is an airflow that flows through the second vent-hole 17a formed in a region positioned on the −Y-direction side of the second side wall 17.

After flowing into the interior of the housing 10 through the second vent-hole 17a, the airflow F1 reaches the side face 60B of the heatsink 60, and flows into the air flow path 64 of the heatsink 60. A heat exchange is carried out between the air flowing along the air flow path 64 and the surface of the fin 63, and heat of the heatsink 60 moves to the air flowing along the air flow path 64. The air used in the heat exchange is discharged to the exterior of the housing 10 from the first vent-hole 16a.

After flowing into the interior of the housing 10 through the second vent-hole 17a, the airflow F2 collides with the first guide member 70A. The air that collides with the first guide member 70A flows in the direction of inclination 71C, reaches the side face 60B of the heatsink 60, and flows into the air flow path 64 of the heatsink 60. A heat exchange is carried out between the air flowing along the air flow path 64 and the surface of the fin 63, and heat of the heatsink 60 moves to the air flowing along the air flow path 64. The air used in the heat exchange is discharged to the exterior of the housing 10 from the first vent-hole 16a.

After flowing into the interior of the housing 10 through the second vent-hole 17a, the airflow F3 collides with the second guide member 70B. The air that collides with the second guide member 70B flows in the direction of inclination 72D, reaches the side face 60B of the heatsink 60, and flows into the air flow path 64 of the heatsink 60. A heat exchange is carried out between the air flowing along the air flow path 64 and the surface of the fin 63, and heat of the heatsink 60 moves to the air flowing along the air flow path 64. The air used in the heat exchange is discharged to the exterior of the housing 10 from the first vent-hole 16a.

According to the semiconductor storage device 3 having this kind of configuration, the airflows F2 and F3 can be guided to the air flow path 64 of the heatsink 60 by providing the first guide member 70A and the second guide member 70B on the heatsink 60. Consequently, in comparison with a structure in which no guide member is provided, a greater amount of air can be caused to flow into the air flow path 64, and a heat exchange carried out between the air flowing along the air flow path 64 and the surface of the fin 63 can be promoted. That is, the advantage of heat dissipation improvement obtained according to the first embodiment can be further heightened.

In the present embodiment, a structure in which the guide member 70 is fixed to a side face of the heatsink 60 is described. As a modification of the present embodiment, the heatsink 60 and the guide member 70 may be formed in an integrated member. In other words, in a process of manufacturing the heatsink 60, the heatsink 60 may include a guide portion having the same structure as the heretofore described guide member 70.

Electronic Part Modification

In the heretofore described embodiments, the NAND 25 is described as an example of an electronic part. Each of the controller 23 and the DRAM 24 may also be used as an electronic part. That is, the heatsink 60 may be connected to the controller 23, or the heatsink 60 may be connected to the DRAM 24. The electronic part is not limited to the heretofore described embodiments. For example, the electronic part may be a processor or electronic equipment.

According to at least one of the heretofore described embodiments, a semiconductor storage device has a substrate, an electronic part, a capacitor, and a heatsink. The electronic part is mounted on the substrate. The capacitor is mounted on the substrate, and coincides with the electronic part in the thickness direction of the substrate. The heatsink has a supporting portion, which supports the capacitor, and an air flow path. The heatsink is connected to the electronic part. Because of this, heat dissipation of the semiconductor storage device can be improved.

While certain embodiments have been described, these embodiments have been presented by way of example only, and are not intended to limit the scope of the disclosure. Indeed, the novel embodiments described herein may be embodied in a variety of other forms; furthermore, various omissions, substitutions, and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A semiconductor storage device, comprising:
    a substrate;
    a semiconductor chip that is mounted on the substrate;
    a capacitor that is mounted on the substrate and overlaps with the semiconductor chip in a thickness direction of the substrate; and
    a heatsink having fins and in which the capacitor is mounted.

2. The semiconductor storage device according to claim 1, wherein the fins extend in the thickness direction of the substrate.

3. The semiconductor storage device according to claim 1, comprising:
    a housing that houses the substrate, the semiconductor chip, the capacitor, and the heatsink; and
    a heat conducting body connected to an inner face of the housing, wherein
    the heatsink has first and second plate portions on opposite sides thereof,
    the semiconductor chip is connected to the second plate portion, and
    the heat conducting body is provided between the inner face of the housing and the second plate portion.

4. The semiconductor storage device according to claim 3, further comprising:
    another semiconductor chip between the substrate and the heat conducting body.

5. The semiconductor storage device according to claim 4, wherein
    the substrate includes a first face and a second face opposite to the first face, and
    the semiconductor chip and the another semiconductor chip are mounted on the first and second faces, respectively.

6. The semiconductor storage device according to claim 5, wherein
    the housing has a first housing member that opposes the first face and a second housing member that opposes the second face, and
    the inner face of the housing is an inner face of the second housing member.

7. The semiconductor storage device according to claim 6, further comprising:
    another heat conducting body that is between the first housing member and the first plate portion and is connected to the first plate portion.

8. The semiconductor storage device according to claim 1, wherein
    the capacitor is inserted into an opening in the heatsink that extends in a first direction.

9. The semiconductor storage device according to claim 8, further comprising
    a plurality of additional capacitors, each of which is inserted into an opening in the heatsink that extends in a second direction that is perpendicular to the first direction.

10. The semiconductor storage device according to claim 1, further comprising:
    a housing that houses the substrate, the semiconductor chip, the capacitor, and the heatsink, wherein the housing includes first and second side walls, each of which has a vent-hole to allow air to flow into and out of the housing.

11. The semiconductor storage device according to claim 10, wherein the fins extend in parallel both in the thickness direction of the substrate and in a direction of the air flow into and out of the housing.

12. The semiconductor storage device according to claim 10, wherein
the housing has a guide portion inclined with respect to a direction of the air flow into the housing, and
the guide portion is positioned in a region between one of the side walls and the heatsink.

13. The semiconductor storage device according to claim 10, wherein
the heatsink has a guide portion inclined with respect to a direction of the air flow into the housing, and
the guide portion is positioned in a region between one of the side walls and the heatsink.

14. A semiconductor storage device, comprising:
a substrate;
first and second semiconductor chips that are mounted on respective opposing surfaces of the substrate;
a plurality of capacitors that are mounted on the substrate and overlaps with the first and second semiconductor chips in a thickness direction of the substrate; and
a heatsink having fins and in which the capacitors are mounted.

15. The semiconductor storage device according to claim 14, wherein
the opposing surfaces include a first surface on which the first semiconductor chip is mounted and a second surface on which the second semiconductor chip is mounted, and
the first semiconductor chip is between the heatsink and the substrate.

16. The semiconductor storage device according to claim 15, further comprising:
a first heat conducting body in contact with the heat sink and a second heat conducting body in contact with the second semiconductor chip.

17. The semiconductor storage device according to claim 14, wherein
one of the capacitors is inserted into an opening in the heatsink that extends in a first direction, and
at least one of the capacitors is inserted into an opening in the heatsink that extends in a second direction that is perpendicular to the first direction.

18. The semiconductor storage device according to claim 17, wherein the fins extend in parallel both in the thickness direction of the substrate and in the first direction.

19. The semiconductor storage device according to claim 14, wherein the first and second semiconductor chips are each a NAND type flash memory chip.

20. A semiconductor storage device, comprising:
a substrate;
a semiconductor chip that is mounted on the substrate;
a capacitor that is mounted on the substrate and overlaps with the semiconductor chip in a thickness direction of the substrate; and
a heatsink having fins including a first fin and a second fin, a length of the first fin being different from a length of the second fin, the first fin and the second fin forming a support member in which the capacitor is inserted, wherein
the capacitor is in contact with the first fin and the second fin.

* * * * *